United States Patent [19]

Dahlbäck

[11] Patent Number: 5,620,536
[45] Date of Patent: Apr. 15, 1997

[54] MANUFACTURE OF ZIRCONIUM CLADDING TUBE WITH INTERNAL LINER

[75] Inventor: Mats Dahlbäck, Västerås, Sweden

[73] Assignee: ABB Atom AB, Västerås, Sweden

[21] Appl. No.: 284,648

[22] PCT Filed: Dec. 15, 1993

[86] PCT No.: PCT/SE93/01070

§ 371 Date: Aug. 11, 1994

§ 102(e) Date: Aug. 11, 1994

[87] PCT Pub. No.: WO94/15343

PCT Pub. Date: Jul. 7, 1994

[30] Foreign Application Priority Data

Dec. 18, 1992 [SE] Sweden ................... 9203871

[51] Int. Cl.⁶ .................. G21C 21/02; G21C 3/20
[52] U.S. Cl. ................ 148/519; 148/520; 148/672; 376/416; 976/DIG. 283
[58] Field of Search .................. 148/519, 520, 148/672, 421; 420/422; 376/417, 416, 415, 414; 976/DIG. 43, DIG. 53, DIG. 44, DIG. 283

[56] References Cited

U.S. PATENT DOCUMENTS

| | | | |
|---|---|---|---|
| 4,390,497 | 6/1983 | Rosenbaum et al. | 148/519 |
| 4,576,654 | 3/1986 | Eddens et al. | 148/519 |
| 4,718,949 | 1/1988 | Takase et al. | 148/672 |
| 4,728,491 | 3/1988 | Reschke et al. | 148/672 |
| 4,770,847 | 9/1988 | Plaza-Meyer et al. | 148/672 |
| 4,918,989 | 4/1990 | Desruelles et al. | 73/627 |
| 5,223,206 | 6/1993 | Rosenbaum | 148/672 |
| 5,230,758 | 7/1993 | Foster et al. | 148/672 |
| 5,285,485 | 2/1994 | Rosenbaum et al. | 148/672 |
| 5,437,747 | 8/1995 | Adamson et al. | 148/520 |

FOREIGN PATENT DOCUMENTS

| | | |
|---|---|---|
| 121204 | 10/1984 | European Pat. Off. . |
| 155603 | 9/1985 | European Pat. Off. . |
| 0194797 | 9/1986 | European Pat. Off. . |
| 0425465 | 5/1991 | European Pat. Off. . |
| 459340 | 6/1989 | Sweden . |

*Primary Examiner*—David A. Simmons
*Assistant Examiner*—Margery S. Phipps
*Attorney, Agent, or Firm*—Watson Cole Stevens Davis, P.L.L.C.

[57] ABSTRACT

A method of manufacturing nuclear fuel elements which include fuel rods whose cladding tubes are provided with an internal liner layer to obtain PCT resistance in the nuclear fuel element involves carefully choosing parameters for heat treatment of the inner component even from the machining of an ingot of the inner component. The internal layer of zirconium or a zirconium alloy, suitable as inner layer in a PCI-resistant cladding, from the fabrication of an ingot of the inner component up to the completion of a cladding tube, including forging, rolling, extrusion, heat treatment and final heat treatment, is manufactured in such a way that the temperature in the inner component never exceeds the temperature when an incipient phase transformation to beta phase takes place.

16 Claims, 1 Drawing Sheet

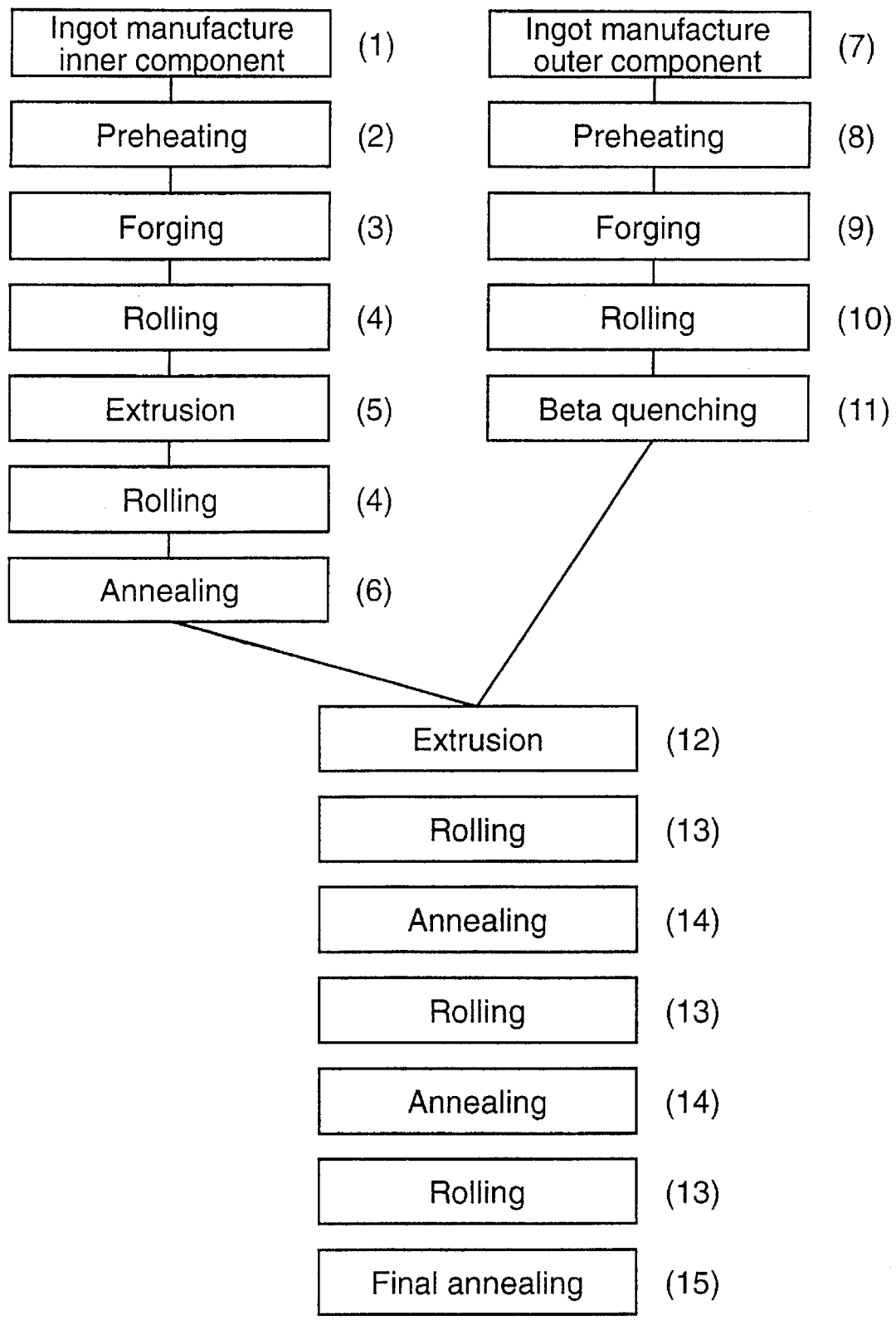

MANUFACTURE OF ZIRCONIUM CLADDING TUBE WITH INTERNAL LINER

TECHNICAL FIELD

The present invention relates to a method of manufacturing a nuclear fuel element that includes fuel rods, the cladding tubes of which are provided with an internal liner of zirconium or a zirconium alloy.

BACKGROUND ART

A nuclear fuel element comprises fuel rods with cladding tubes filled with fuel pellets. It is known to provide cladding tubes with an internal layer of zirconium or a zirconium alloy to protect the fuel element from destruction caused by pellet-clad interaction, PCI, in case of rapid power increases.

SE 7810262 describes a nuclear fuel element with improved properties regarding resistance to PCI and comprising a composite cladding container comprising an outer part of a zirconium alloy and an inner part bonded to the outer part and consisting of zirconium with an impurity content to about 1000 to 5000 ppm. This composite cladding tube is manufactured by inserting a sleeve of sponge zirconium, which is to be used as an internal part, into a hollow billet of a zirconium alloy, which is to constitute the outer part, whereupon the unit is subjected to explosion bonding of the sleeve to the billet. Thereafter, the composite product is extruded at a temperature of about 538°–750° C. while using conventional extrusion methods. Thereafter, the extruded composite produce is subjected to a conventional tube production until the desired dimension of the cladding has been reached. The bond of the sleeve to the billet can also take place by means of heating to 750° C. for 8 hours to achieve a diffusion bond. The manufacture of the composite cladding can also take place by extruding the unit, consisting of the inner sleeve and the outer shell, while using conventional technique.

EP 194 797 describes a cladding tube with an outer component and an inner component intended to protect the cladding against PCI damage. The inner component has a specific composition, zirconium with 0.4–0.6% tin, 0.5–1.4% iron and 100–700 ppm oxygen, in order to impart to the inner component good corrosion properties in the event that water should penetrate into the rod. The cladding tube is manufactured by processing the ingot of the inner component in a conventional way for the manufacture of Zircaloy, including beta quenching, before the inner component is joined to the outer component. After the joining of the outer and inner components, the cladding tube can be additionally beta-quenched either before the last cold-rolling step by beta-quenching the outer surface, or before the penultimate rolling step by beta-quenching the entire cladding wall comprising both the outer and inner components.

EP 155 603 also describes a nuclear fuel element comprising a composite cladding tube with an internal lining of zirconium to avoid cracking in the cladding upon thermal expansion of the pellets. According to this patent specification, it is known to reduce the sensitivity of the zirconium lining to cracking by limiting the total amount of impurities to a level below 5000 ppm and by maintaining the ratio of the oxygen content to the iron content greater than 1. The manufacture of a zirconium-lined cladding tube is performed by melting zirconium into an ingot which is then forged and shaped into a hollow billet. The hollow billet is inserted into another hollow billet of a zirconium alloy. The composite billets are heat-extruded into a tube blank. The tube blank is then subjected to repeated cold rolling operations and heat treatments according to conventional tube manufacture. A heat-treatment step consisting of a solution treatment at 800° or 860° C., near the phase transformation temperature to cause secondary phases in the material to become dissolved, and thereafter a rapid cooling to room temperature as well as a stress-removing heat treatment at a low temperature, for example 550° C. for 2 hours, are carried out either after the forging or after the heat extrusion or as a last step on the finished tube, whereby it is considered to be especially effective to carry out the heat treatment as a last step. The best result is achieved according to the specification when the solution treatment is carried out in all the alternative steps during the process.

SE 8903595-0 describes a method for manufacturing cladding tubes of zirconium alloy, the outer surface of which is to obtain improved resistance to nodular corrosion during operation in a boiling reactor. The cladding tube is manufactured from a Zr-base alloy and is preferably beta-quenched before extrusion. Before the last cold-rolling step, the outer surface of the tube is beta-quenched. After extrusion, thus, only an outer part of the tube is beta-quenched in order to impart to this part improved corrosion resistance. Such a tube can also be provided with an inner component for PCI protection. After extrusion, the inner component in such a case will not be affected by the beta quenching prior to the last rolling step.

SE 8301770-7 describes a fuel rod comprising a composite cladding tube with an internal layer consisting of sponge zirconium alloyed with 0.1% tin. This fuel rod exhibits an increased resistance to the corrosive effect of water and water steam at elevated temperature. The cladding tube is manufactured by arranging a tube of the zirconium alloy, constituting the inner component, in a coarser tube of Zircaloy, the end surfaces of the two tubes being welded together. Thereafter, the composite tube is extruded without being subjected to any heating. The extruded product is then cold-rolled in several steps with intermediate recrystallization annealings at about 650° C. and is finally annealed after the last cold rolling at about 525° C.

The inner side of the cladding tube can be subjected to the corrosive effect of water and water steam in those cases where damage occurs on the cladding, which may result in water penetrating into the tube. The water will then become evaporated upon contact with the hotter fuel pellets. This results in the inside of the cladding tube being subjected to a corrosive effect of water/water steam of high temperature. When zirconium and zirconium alloys are corroded, hydrogen is formed, which to a certain extent is taken up by the cladding. The hydrogen will be precipitated in the form of zirconium hydrides. The zirconium hydrides are brittle and have a negative influence on the integrity of the tube. It is therefore of importance that the corrosion and the hydrogen absorption, caused by the corrosion, are as slight as possible in order not to risk that damage involving the penetration of water is extended such that a major quantity of water can penetrate through the tube and leaching of uranium dioxide and radioactive fission products can take place. Damage to a cladding tube can occur for several reasons, for example wear or defects in the welds.

The outer side of a fuel rod is always in contact with water and water steam, and it is known that heat treatments affect zirconium and the resistance of zirconium alloys to corrosion in water and water steam at a high temperature. Thus, a large number of publications describe heat treatments intended to improve the resistance of zirconium alloys to corrosion. EP 71193 describes how, during conventional manufacture, an ingot of a zirconium alloy is first forged in the beta-phase range and thereafter heat-treated in the beta-phase range followed by rapid quenching. Then, the billet is forged in the alpha-phase range and extruded, followed by tube manufacture involving cold-working steps and intermediate annealings in a conventional manner. To improve the corrosion resistance of the tube, it was found that the favourable solution treatment in the beta or alpha+beta-phase range followed by rapid quenching from the heat treatment temperature should be carried out also at a later stage in the process, after hot extrusion of the billet.

SUMMARY OF THE INVENTION

According to the present invention, it has proved that a nuclear fuel element can exhibit an improved resistance to the effect of water and water steam in case of damage involving the penetration of water into a fuel rod provided with an internal liner layer by a careful choice, during the manufacture of the cladding tube, of parameters for heat treatment of the inner component from the very machining of an ingot of the inner component.

Surprisingly, it has proved that also the heat treatments during the manufacture of the inner component into a composite cladding tube, which are carried out before the inner component is joined to the outer component to be extruded together, are of great importance for obtaining a fuel element with improved resistance to the corrosive effect of water and water steam and where the harmful hydrogen absorption during the corrosion process is reduced, in the event that a cladding tube is damaged such that water can penetrate through the cladding.

It has also proved, according to the present invention, that by choosing an optimum composition of the liner layer, the effect of manufacture, with chosen heat-treatment parameters for all the heat treatments, can be further improved.

According to the present invention, a fuel element comprising cladding tubes, with an internal layer, is Co be manufactured by producing an ingot of zirconium or a zirconium alloy, for example zirconium-tin, suitable as an inner layer in a PCI-resistant cladding. The ingot is machined by forging operations and possibly by rolling and extrusion into a suitable dimension to be joined to the outer component. To obtain optimum properties of the inner component, this component, during all the process steps after the manufacture of the ingot, such as forging, heat treatment, rolling, extrusion, intermediate annealing and final annealing, is to be maintained at temperatures lower than the temperature at which beta phase starts forming in the inner component.

An incipient transformation of alpha phase into beta phase takes place for zirconium with low oxygen contents, which is usually used as inner component in a PCI-resistant cladding, at 800° C. For zirconium-tin alloys, which are also used as inner component, tin stabilizes the alpha phase and the transformation temperature lies just above 862° C. During the formation of beta phase, a gradual dissolution of secondary phases, impurities and precipitated particles in the matrix takes place.

According to the present invention, the inner component should not be heat-treated at temperatures where beta phase is formed, and secondary phases and impurities should be prevented from dissolving in the matrix. This also applies to the early stage of the manufacturing chain, such as preheating, preliminary forging, and final forging.

For the manufacture of a nuclear fuel element according to the invention, an ingot is manufactured from the inner component. Ingots of zirconium are heat-treated in the alpha-phase range at 700°–800° C. and ingots of a zirconium-tin alloy are heat-treated in the alpha-phase range at 700°–860° C. before being forged. After that, a repeated forging operation with preheating within the same temperature interval in the alpha-phase range can take place. It is thus important that also the preliminary forging of the ingot take place at a temperature below the temperature at which an incipient transformation to beta phase takes place. An advantage of zirconium-tin alloys is that these can be heated to a higher temperature before the phase transformation takes place, which facilitates the machining of the ingot. Additional machining of the inner component, to obtain a suitable dimension of the inner component for joining to the outer component, is suitably carried out by hot rolling and extrusion. The temperature of the inner component should not exceed 710° C. C. ng these process stages.

A further improvement of the corrosion resistance of the inner component can be obtained by introducing additional heat treatment of a billet of the inner component in addition to the heat treatments which take place in connection with forging, rolling and/or extrusion, before it is joined to the outer component. This additional heat treatment is carried out in the alpha-phase range at 600°–800° C. for billets of zirconium and 600°–860° C. for billets of zironium-tin alloy and preferably within the interval 650°–750° C., irrespective of the composition of the billet. This extra heat treatment can be carried out as a last step before the inner component is joined to the outer component or earlier in the process chain, for example before the inner component is extruded.

When the inner component has been machined into a suitable dimension, it can be joined to the outer component by passing a tube of the inner component into a coarser tube of the outer component in a conventional way.

The outer component consists of a zirconium alloy intended constitute a supporting part of a composite cladding tube, for example Zircaloy 2 and Zircaloy 4, whose contents of alloying materials lie within the limits 1.2–1.7% tin, 0.07–0.24% iron, 0.05–0.15% chromium and 0–0.08% nickel, the balance being zirconium and any impurities of a conventional kind or Zr 2.5 Nb. The outer component is machined in a conventional way by forging in the beta or alpha+beta-phase range followed by forging in the alpha-phase range and further degradation by forging and extrusion (if any). Before the outer component is joined to the inner component, the billet is beta-quenched by heating to the beta-phase range, for example 1050° C., and is thereafter rapidly cooled.

The composite billet consisting of an inner component and an outer component, is extruded at a temperature below 710° C.

After the extrusion, the tube blank is machined in a conventional way by means of a number of cold rolling steps with intermediate heat-treatment operations and a final heat treatment. Intermediate heat treatments of the inner component are performed within the interval 525°–700° C. and the final heat treatment is performed within the interval 400°–700° C.

For the manufacture of a fuel element with cladding tubes with inner layers of zirconium, an extra heat treatment of the tube blank can be carried out after the inner component has been joined to the outer component. This heat treatment is carried out at in the alpha-phase range, suitably at 600°–800° C. The limited diffusion of alloying materials which can take place between the outer component and the inner component during the heat treatment is not harmful to the PCI resistance of the layer. To ensure that a heat treatment of this kind does not have an adverse effect on the corrosion properties of the outer component, the outer part of the tube can be beta-quenched after the extra heat treatment has been carried out. During beta quenching, the outer part of the tube is heated to a temperature in the beta-phase range, for example 1050° C. and is then rapidly cooled. The inner component can consist of pure zirconium or consist of a zirconium-tin alloy with 0.1 to 1% tin, such as an alloy of zirconium with 0.1–0.5% tin and with an iron content less than 550 ppm, preferably 200–450 ppm and less than 600 ppm oxygen. Impurities in zirconium and a zirconium-tin alloy shall be below the limits which normally apply to reactor-grade zirconium, namely, Al 75 ppm, B 0.5 ppm, C 100 ppm, Ca 30 ppm, Cd 0.5 ppm, Cl 20 ppm, Co 20 ppm, Cu 50 ppm, H 25 ppm, Hf 100 ppm, Mg 20 ppm, Mn 50 ppm, Mo 50 ppm, N 65 ppm, Na 20 ppm, Nb 100 ppm, Ni 70 ppm, P 30 ppm, Pb 100 ppm, Si 100 ppm, Ta 200 ppm, Ti 50 ppm, U 3.5 ppm, V 50 ppm, W 100 ppm and Cr 200 ppm.

The inner component can also consist of other zirconium alloys.

BRIEF DESCRIPTION OF THE DRAWING

The invention will be explained in greater detail by description of an embodiment with reference to the accompanying FIGURE which shows a flow diagram for the manufacture of a cladding tube.

An ingot of the inner component is manufactured (1). The inner component consists of zirconium with 0.25% Sn, 310 ppm Fe and 430 ppm O as well as impurity quantities normally occurring in reactor-grade zirconium. Thereafter, the ingot is preheated (2) and forged (3). These steps can be repeated by preliminary forging and finally forging the ingot. The ingot is preheated to a temperature of 820° C. for 8 hours (2) and is forged (3), whereupon an additional heating to 800° C. (2) and a final forging (3) are carried out. After forging, the billet is rolled down (4) and extruded at a temperature of about 670° C. (5). Thereafter, the billet is annealed at 650° C. for 5 hours (6).

The outer component is manufactured conventionally by forging and is beta-quenched before extrusion (7, 8, 9, 10, 11).

The inner component is joined to the outer component in conventional manner and the composite body is extruded (12) at a temperature of about 670° C. Thereafter, the tube blank is rolled in three stages into the final dimension with intermediate annealings at 570° C. for 1 hour (13, 14). After the last rolling, the tube is finally annealed at 570° C. for 1.5 hours (15).

The cladding tubes are filled with fuel pellets and sealed, whereupon they are assembled into bundles forming nuclear fuel elements intended for light-water reactors.

I claim:

1. A method of manufacturing a composite cladding tube of a nuclear fuel element which is resistant to pellet-clad interaction, said composite cladding tube comprising an inner portion formed from a first component selected from the group consisting of zirconium and a zirconium alloy and an outer portion formed from a second component selected from the group consisting of Zircaloy 2, Zircaloy 4 and Zr 2.5 Nb, said method comprising the steps of:

(a) providing an ingot of said first component,
   (b) forging rolling, extruding, and heat treating said ingot of said first component to form an inner billet,
   (c) positioning said inner billet from step (b) within an outer machined billet formed from an ingot of said second component,
   (d) extruding said joined billets from step (c) to form a joined tube blank, and
   (e) machining said tube blank from step (d) to provide said composite cladding tube,
   (f) said steps (b)–(e) being conducted at a temperature below that which causes incipient beta-phase transformation within said first component.

2. A method according to claim 1, including between steps (a) and (b) a step ($a^1$) of preheating said ingot of said first component in an alpha-phase range temperature.

3. A method according to claim 2, wherein in step (b) said ingot of said first component is subjected to forging in two steps.

4. A method according to claim 2, wherein said first component consists essentially of zirconium-tin alloy comprising zirconium with 0.1–1% tin, less than 600 ppm iron and less than 600 ppm oxygen.

5. A method according to claim 4, wherein step ($a^1$) is conducted at a temperature of 700°–860° C.

6. A method according to claim 4, wherein in step (b) said first component is heat treated at a temperature of 600°–860° C.

7. A method according to claim 6, wherein said temperature is 650°–750° C.

8. A method according to claim 2, wherein said first component consists essentially of zirconium.

9. A method according to claim 8, wherein step ($a^1$) is conducted at a temperature of 700°–800° C.

10. A method according to claim 8, wherein in step (b) said first component is heat treated at a temperature of 600°–800° C.

11. A method according to claim 10, wherein said temperature is 650°–750° C.

12. A method according to claim 1, wherein step (d) is conducted at a temperature below 710° C.

13. A method according to claim 1, wherein in step (b) said first component is rolled and extruded at a temperature below 710° C.

14. A method according to claim 1, wherein step (e) includes cold rolling said tube blank, intermediate heating of said tube blank at a temperature of 525°–700° C., and a final heating of said tube blank at a temperature of 400°–700° C.

15. A method according to claim 1, including after step (d) a step ($d^1$) of heat treating said tube blank at a temperature of 600°–800° C.

16. A method according to claim 15 including after step ($d^1$) a step of beta-quenching said outer machined billet.

* * * * *